Jan. 9, 1934. E. S. BUSH 1,943,057
ENGINE AND TRANSMISSION CONTROL MEANS
Filed Feb. 8, 1932 3 Sheets-Sheet 1
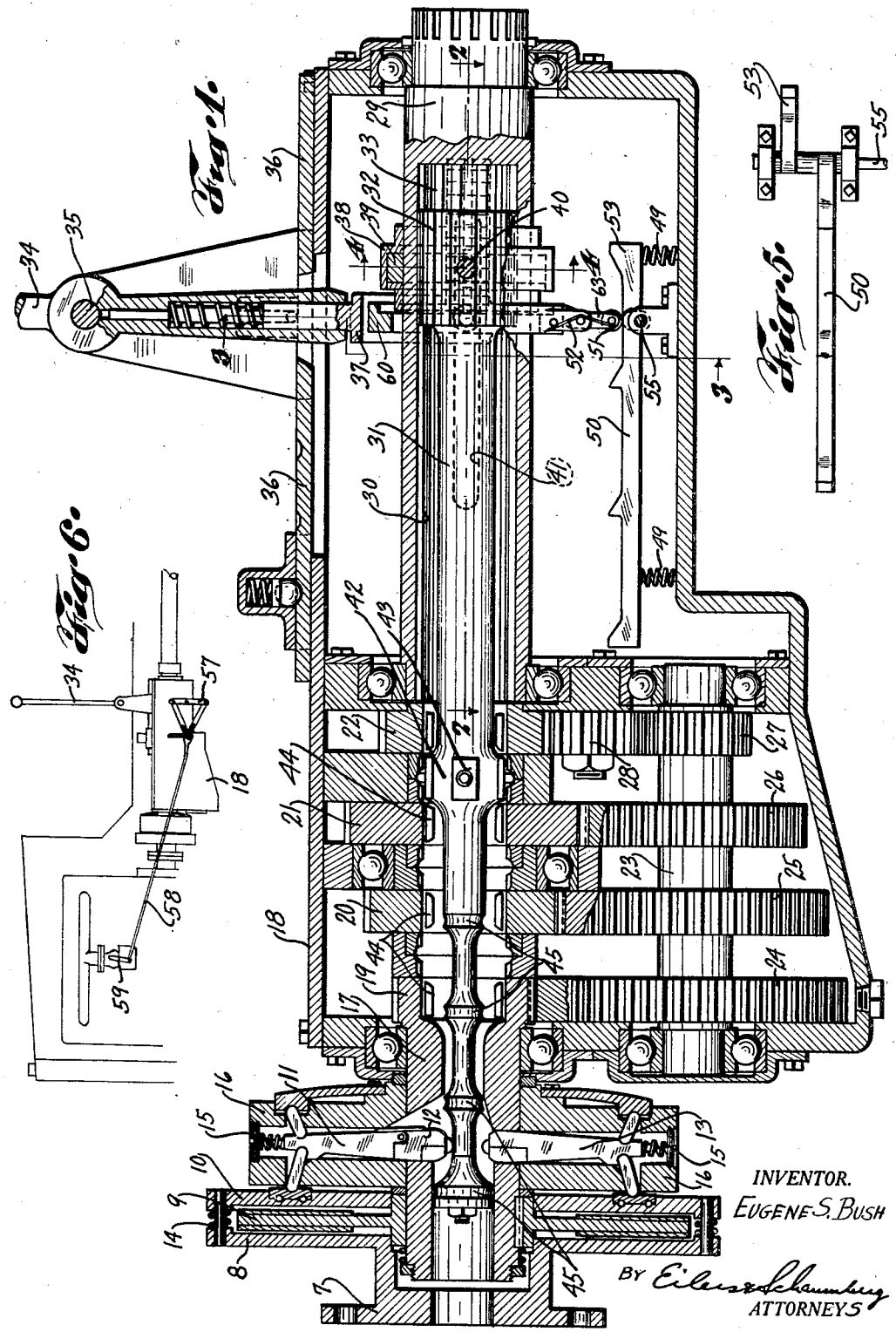
INVENTOR.
EUGENE S. BUSH
BY Eilers Schaumberg
ATTORNEYS

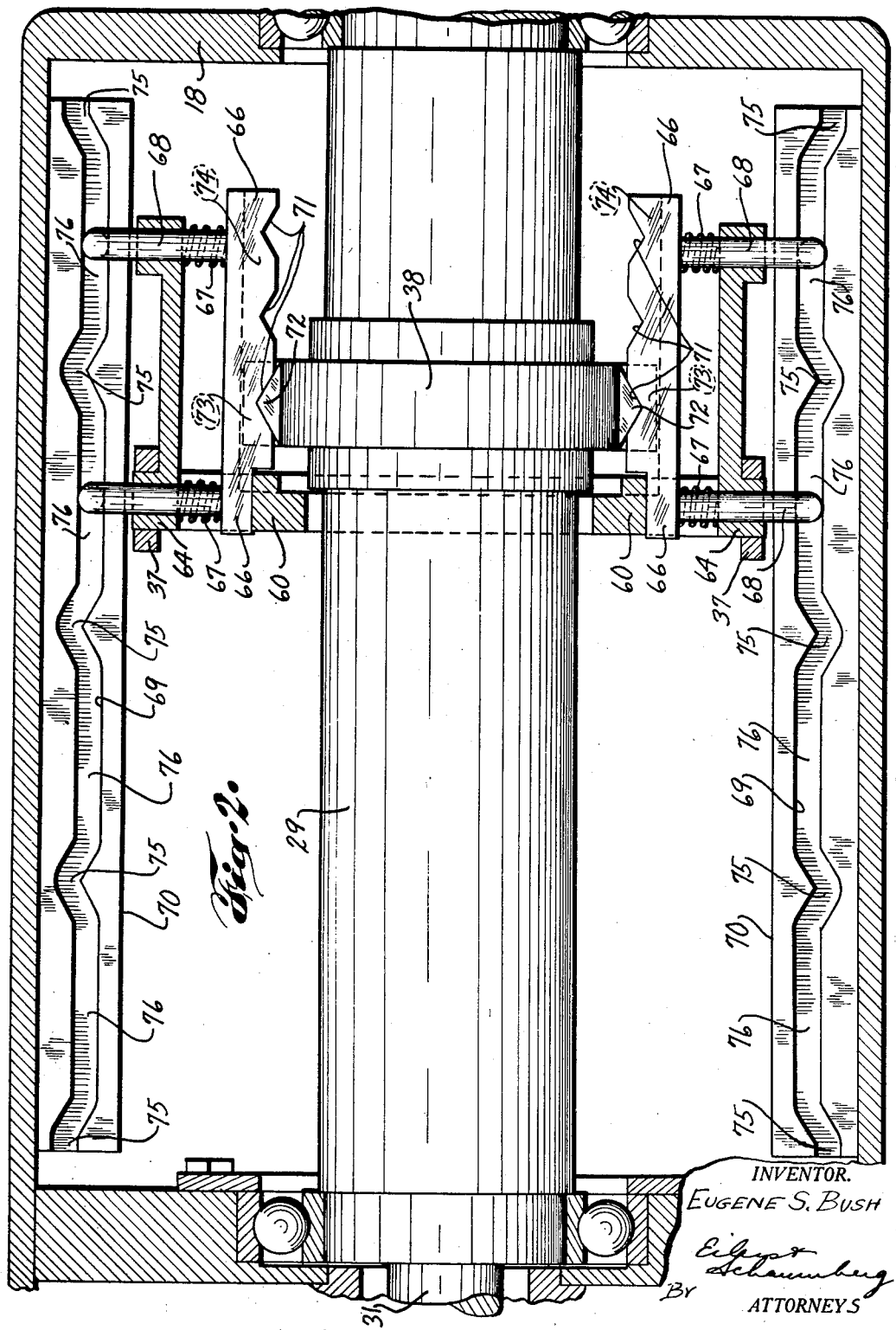

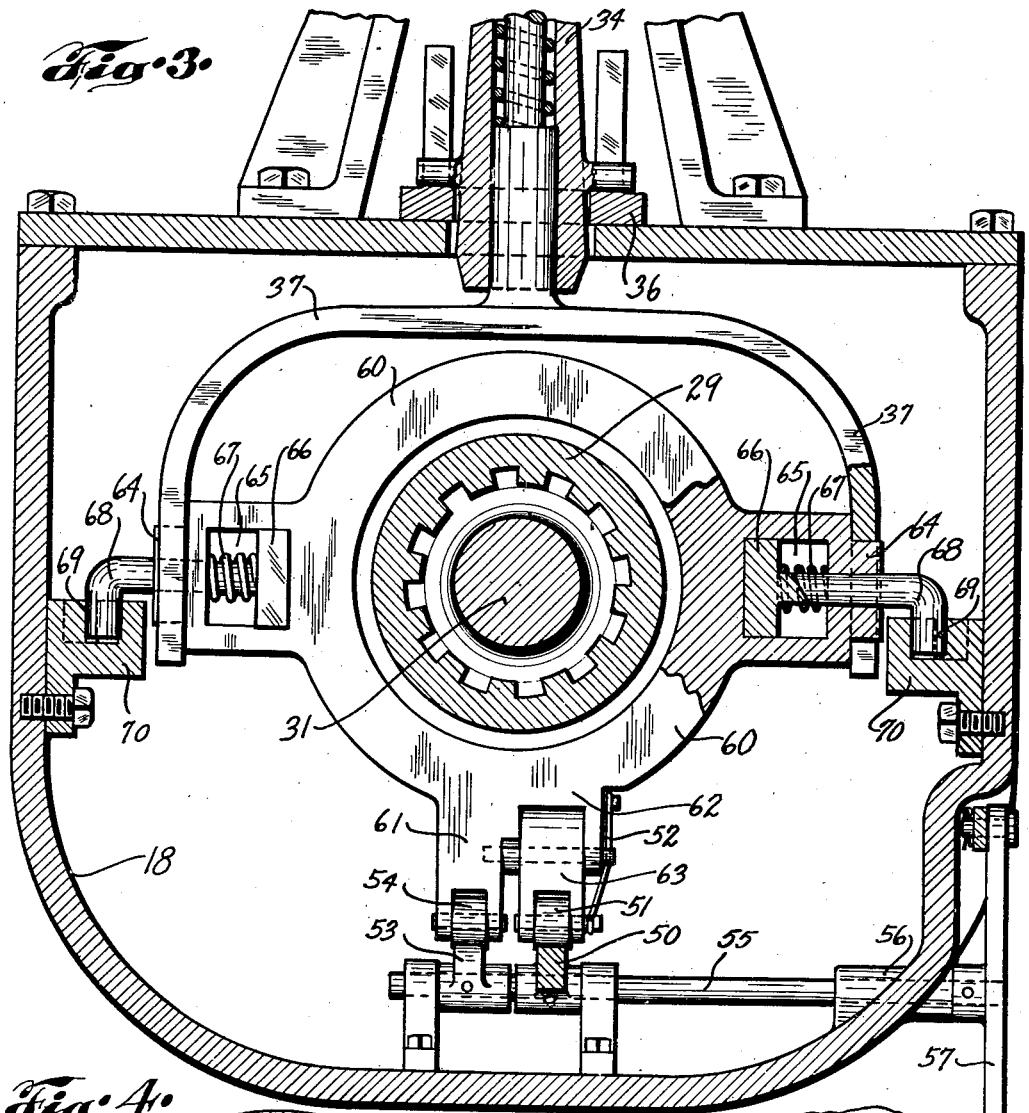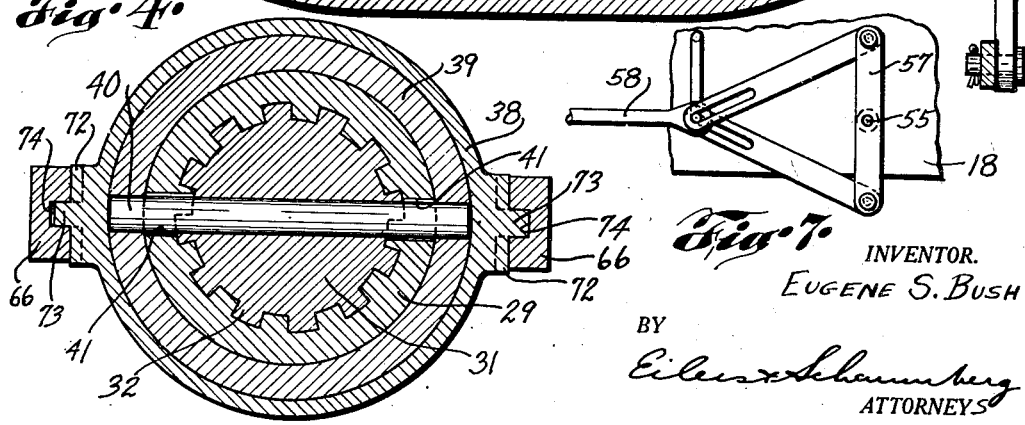

Patented Jan. 9, 1934

1,943,057

UNITED STATES PATENT OFFICE 1,943,057

ENGINE AND TRANSMISSION CONTROL MEANS

Eugene S. Bush, St. Louis, Mo., assignor to Bush Manufacturing Company, St. Louis, Mo., a corporation of Missouri Application February 8, 1932. Serial No. 591,590

17 Claims. (Cl. 192—.01)

This invention relates to improved engine and transmission control means, and more particularly to improvements in coordinated controls adapted for the engine and transmission of automotive power plants. The present application constitutes a division in part, and in part a continuation of my copending application, Serial No. 514,953, filed February 11, 1931.

An object of the present invention is attained in the provision of improved means for coordinating the speed of a prime mover, with the position of a manually-controlled gear-change member. As exemplified in the present disclosure, this object is attained in the provision of means for automatically positioning the throttle of an automotive engine, which means is actuated by manual movement of a transmission control lever.

Another object of this invention is attained in the provision of means arranged to effect a predetermined sequence of throttle control movements, coordinately with, and responsive to the movement of a transmission control member through the range of its movement normally utilized for shifting into and through the different gear ratios.

Yet another object of the invention is attained in a simplified and improved organization of elements such that it is possible to control, coordinately, a clutch, transmission, and engine throttle, through manipulation of a combined control member therefor.

A further object of the invention is attained in an improved structural arrangement for automatically accelerating a prime mover connected to a transmission, upon manipulation of a speed change control member between and through its several speed change positions; the arrangement being such that these operations are rendered uniform, the operator is relieved of any mental effort, and the speeds of the prime mover and gearing are automatically coordinated for best results in shifting between gear ratios.

An additional general object may be stated as a provision of an improved, common engine control, transmission control and clutch control, adaptable either for general mechanical use, or to the control of an automotive vehicle.

Further objects and advantages of the invention will appear as the description proceeds, and from the accompanying drawings of an exemplary embodiment of the invention. In the drawings:

Fig. 1 is a vertical, longitudinal, sectional elevation through a transmission and clutch assembly embodying the principles of the present invention; Fig. 2 is a sectional elevation along a horizontal plane defined by the line 2—2 of Fig. 1; Fig. 3 is a transverse vertical sectional elevation along line 3—3 of Fig. 1; Fig. 4 is a vertical section along line 4—4 of Fig. 1; Fig. 5 is a plan view of a cam assembly preferably employed for purposes of engine throttle control according to the illustrated example; Fig. 6 is a diagrammatic side view, showing one manner of operatively connecting the cam assembly of Fig. 5, to a throttle of an internal combustion engine, and Fig. 7 is an elevation showing a portion of a connection between the control assembly and the engine throttle.

The transmission and clutch assembly shown particularly in Fig. 1, constitutes, of itself, no part of the present invention, but is particularly described and claimed in my copending application of Serial No. 585,683, and filed January 9, 1932. It may be noted for purposes of the present description that connection is made to an engine or other prime mover, through a flanged hub or like element 7, extended to form an element 8 of a friction clutch assembly. Companion plates or discs of the clutch are indicated at 9 and 10, the clutch being engageable and disengageable through a plurality of radially movable plungers, some of which, indicated at 11, are provided with hinged inner ends 12, and others, such as plungers 13, being of relatively rigid construction, and somewhat less length than the plungers 11. Clutch elements 8 and 10 are biased apart as by springs 14, and the plungers are biased inwardly toward clutch-disengaging position as by springs 15, the clutch-actuating assembly being carried internally of a housing 16, mounted on a hollow rotatable power shaft 17, extending within the transmission case 18. The speed-change gearing of the transmission presently illustrated is identified with a plurality of aligned, spaced, centrally hollow gears 19, 20, 21 and 22, these gears being so assembled so as to form a continuous passage or bore therethrough, for a purpose hereinafter appearing.

Carried by a countershaft 23 are a plurality of gears 24, 25, 26 and 27, each of gears 24 through 27 being secured to the shaft 23, and the gears 24 through 26 meshing respectively with gears numbered 19 through 21. The gear 27 constitutes a reverse driving gear, and operates through an idler 28 to actuate the gear 22 as appears in Fig. 1.

The power take-off shaft, which may serve as a connection to the propeller shaft of an automotive vehicle, is indicated at 29, and is provided throughout its forward end with a longitudinal bore 30 in which there is disposed for endwise movement, a combined transmission shaft and shiftable power member indicated at 31. The shaft 31 is provided with an externally splined head 32, the splines thereof engaging corresponding internal splines 33 within and along the bore 30 of shaft 29. By this provision even though the shaft 31 is moved endwise for speed change control, as hereinafter appears, this shaft is always kept in rotative, operative connection with the propeller shaft 29.

Speed-change movements of the shaft 31 are brought about through a manual control lever, indicated fragmentarily at 34, arranged for movement about a fixed pivot 35 and extending downwardly in the case 18 through an endwise movable notching and closure member 36, the notches of which coact with a spring-pressed plunger in a manner tending to position the lever 34 in its several "free-running" positions, in which the shaft 31 is free of driving connection with any of the driving elements of the transmission.

The lever 34 projecting through the member 36, terminates inwardly, within the case, in a shifting yoke 37, (Fig. 3). This yoke has connection through parts hereinafter described, to a non-rotatable collar 38, (Fig. 4), within which is rotatably mounted an additional annulus or collar 39 connected as by a pin 40, for rotation with both of the shafts 29 and 31. The pin 40, while rotatively adapted to lock these shafts together, extends outwardly through elongated, diametrally opposed slots 41, in the hollow portion of shaft 29, the slots permitting endwise movement of the shaft 31 and pin 40, without producing any tendency toward endwise movement of shaft 29. The arrangement is thus such that as the lever 34 is moved about its pivot 35 there results, under certain conditions, a corresponding endwise movement of shaft 31, for purposes of speed change control, as well as clutch control, as hereinafter appears.

The shaft 31 is provided with a driving head 42 characterized by a plurality of radial abutments or projections 43 which serve, when the driving head is brought to a position within one of the gears 19, 20, 21 or 22, to be engaged by spaced spring-pressed pawls 44, there being preferably at least a pair of such pawls within each of the gears 19—22, and the arrangement being such that the driving head 42 may be freely moved through or into any of the gears 19—22, due to outward or radial displacement of the pawls 44 by abutments 43, but also such that when the head 42 is positioned in driving engagement within the center pockets in any one of the gears 19—22, the abutments 43 and pawls 44 coact to establish a driving connection between the selected gear and the shaft 31.

The shaft 31 serves also the purpose of actuating the friction clutch plates 8, 9 and 10 coordinately with the establishment of the several operative connections with the gears 19—22. Clutch actuation is effected through a series of cams or nodes 45, spaced along the left hand end (Fig. 1), of shaft 31, conformably to the spacing between centers of the gears 19—22. The relation between the cams 45 and gear engaging head 42, is preferably such that, as shaft 31 is moved to the left (Fig. 1), the head 42 serves to bring one of the gears 19—22 into driving engagement with the shaft, slightly in advance of engagement of the friction clutch, through engagement of one of the cams 45. This clutch actuation is effected, as will appear from the drawings, by outward radial movement of one group of plungers, such as 11, responsively to movement of one of the cams 45, into the plane of the plungers.

It will appear from the foregoing that a unidirectional movement of the speed change control lever 34, serves to effect both a full transmission control, consisting of several predetermined speed-change settings, and serves also to effect, coordinately but sequentially therewith, a series of clutch-engaging and -disengaging movements.

Due to the resilient mounting of the pawls 44, the driving head 42 is free to move without obstruction to its control movement, into or through the gears 19—22. It may also be noted that a plurality of the clutch-actuating plungers 11 are provided with hinged inner ends 12, there being also provided a separate group or set of the plungers 13, somewhat shorter in length than the plungers 11. It will appear that the endmost clutch cam 45 is also of greater diameter than those disposed inwardly of the end of shaft 31, with the result that only the larger clutch head actuates the shortest plungers such as 13, and that this takes place only when the shaft 31 is positioned to bring the driving head 42 in driven engagement with the reverse gear 22. In the other, forward speed positions, due to the hinged inner ends 12 of plungers 11, the smaller clutch heads 45 actuate the plungers 11, and hence the clutch, in sequence, only as the shaft 31 is moved to the left (Fig. 1) as in proceeding from lower to higher gear ratios. Upon the reverse movement of shaft 31, the hinged inner ends 12 of plungers 11 are deflected laterally, to the right, and thus the clutch is not actuated sequentially during movement of the shaft 31 from higher to lower gear ratios, all of which will more fully appear from my copending application of Serial No. 585,683.

Proceeding now to a description of the several parts and the operation of the throttle control assembly, it will appear that, particularly in automotive practice, the speed change control movements are most desirably effected at definite vehicle speeds, considered in connection with engine speeds which correspond, through the different gear ratios, to the speeds of the vehicle. It is obviously possible to represent graphically the speed of the engine corresponding to vehicle speed, given any definite gear ratio. Shifting from one speed ratio to another may obviously be effected with maximum smoothness assuming the engine to be accelerated and decelerated along a line connecting the engine-car speed curves at points corresponding to the speed of the vehicle at which it has been determined it is most desirable to effect speed changes.

This result is automatically accomplished during the shifting or speed change control of the transmission, through the forward speeds, by a cam 50, with which coacts a hingedly mounted cam-follower, preferably in the nature of a roller 51, biased as by a spring 52 toward a vertical cam-engaging position. A companion cam 53 is acted upon by a preferably rigidly mounted cam follower, such as a roller 54, both of the cams being pinned or otherwise secured to a horizontal rock shaft 55, extended through a bearing 56 in the wall of the case 18, and provided at its outer end exteriorly of the case, with a lever or crank 57, (Fig. 7) suitably connected as through a rod 58 to the throttle 59 of the engine (Fig. 6).

Since the movement of the cams 50 and 53 takes place in opposite directions to cause acceleration, the crank 57 is preferably a double ended element as shown, and pivotally connected through paired slotted links to the rod 58. This special form of connection thus provides for throttle-opening movement whether the rock shaft is rotated clockwise or anti-clockwise from its position of rest, as determined by cam springs 49.

As will hereinafter more clearly appear, the rollers 51 and 54 are so disposed as to move along the cams 50 or 53 responsively to the normal unidirectional movement of lever 34. According to the present example, the relatively projecting portions of the cams 50 and 53 result, upon engagement by the respective followers or rollers, in acceleration of the motor, and the relatively reduced portions result, upon engagement, in deceleration of the motor. It will appear obvious that the shape and slope of the cam members are each arrived at preferably by experiment, since rear axle gear ratios and wheel diameters vary in different cars. It is, of course, contemplated that a separate throttle control of any suitable or usual form may be provided and so arranged that the engine is selectively subject to control by the operator in any manner as may be desired, to nullify the effect of the automatic throttle control assembly identified in part with the cams 50 and 53.

It has been determined to be desirable, to the end of coordinating the endwise control movement of shaft 31 with the actuation of the throttle-control cams, to provide a lost-motion or delayed connection between the lever 34 and the shaft 31 in order that the driving head 42 may be disposed in driving engagement with a selected one of the gears 19—22, in advance of substantial motor acceleration through the cams, and further to enable a continuous throttle control through the cams 50 and 53 without altering the position of the driving head 42 with respect to the selected gear. To accomplish this result, I have provided a lost motion assembly, best shown in Figs. 2 and 3, consisting of a longitudinally movable structure including a carriage 60, provided with a depending leg 61 forked to provide a mounting for the roller 54, and a somewhat shorter leg 62 in which is hingedly journalled an arm 63 carrying the roller 51. The carriage 60 is provided with laterally projecting trunnions 64, to which are pivotally connected the opposite apertured ends of the yoke 37, whereby the carriage 60 may be moved, by lever 34, lengthwise of the transmission case and lengthwise of the shaft 29. Inwardly of the trunnions, the carriage is provided with channels 65 in each of which is mounted, for movement toward and away from the shaft 29, a block 66, the blocks being biased to an innermost position, as in Fig. 3, by springs 67. Secured in, and projecting outwardly of each block 66 through apertures therefor in the trunnions 64, are a pair of angulate cam follower pins 68, the outer ends of which are bent downwardly into a cam groove 69, formed, in the example shown, in a cam block 70, secured to the inner side wall of the case 18, there being by preference, one member 70 on each of the opposite sides of the case, as shown, and with which coact a pair of the pins 68 on each side of the carriage. Each of the blocks 66 is preferably provided on its inner face with a row of V-shaped notches or indents 71, the angularity of which corresponds substantially to that of a pair of diametrally opposite projections 72 carried by the member 38, the notches 71 and projections 72 constituting the operative connection between the carriage 60 and the collar 38, and hence through pin 40 to shaft 31. It may here be noted that the collar 38, while permitted movement along the axis of shaft 29, is held against rotation as by diametrally opposite flanges 73, movable lengthwise in grooves 74 in the block 66.

As shown, each of the cam grooves 70 is characterized by a plurality of spaced peak portions 75 and intervening, substantially rectilinear portions 76 so that, as the carriage 60 is moved from one end of its path to the other through lever 34, the blocks 66 as influenced by pins 68, will be periodically drawn outwardly of the carriage to bring the notches 71 away from a position to engage the projections 72. In the described example the arrangement is such that the distance between centers of the peaks 75 is the same as the distance between centers of the pins 68, so that the adjacent follower pins simultaneously engage an adjacent pair of the peaks 75 at each side of the assembly. My preference is also to space the peaks or nose portions 75 appropriately to the spacing between the several noses or high points of cam 50, since as will appear, the roller 51 engages one of the peaks on cam 50 at about the time the followers 68 engage peaks 75. Since the corresponding peak or nose portions 75 of the paired cam grooves 69 lie directly opposite each other, the blocks 66 at opposite sides of this assembly will be simultaneously actuated in opposite directions, as the carriage 60 is moved endwise of the shaft, under influence of the lever 34.

The apexed members 72 coacting with the indents 71 to constitute a form of clutch, serving preferably as the sole connection between the carriage 60 and the collar 38, it will be apparent that as the carriage is shifted in either direction, during that portion of its travel in which the followers 68 occupy the rectilinear portions 76 of the cam grooves, the carriage 60 and collar 38 will be moved together. When, however, the position of carriage 60 is such that as the follower pins begin to enter the peak portions 75 of the cam grooves, the blocks 66 are at once withdrawn from operative engagement with projections 72. Thus the carriage will be moved for a certain distance while the collar remains stationary, and this connection constitutes a delayed-motion or lost-motion connection between the speed-change control lever 34 and the shifting collar 38. During such time as the blocks 66 are held in their outward position or withdrawn to any appreciable degree from the projections 72, the carriage shifting collar ceases to be operatively connected with the speed change lever. When, however, due to movement of the carriage the follower pins are again brought to occupy the rectilinear portions of the cam grooves, the blocks 66 are again seated upon the projection 72 through a different set of the notches or indents 71. The conjoint movement of the parts is thus resumed until the follower pins again encounter the spreading or peak portions of the cam grooves.

In the showing of Figs. 1 and 2, the shifting and throttle control assemblies are shown as occupying a so-called neutral position, i. e., with the elements intermediate their low speed and reverse positions, assuming for example, that it is desired to operate the mechanism in reverse, the shift member 34 is moved forwardly (to the left Fig. 1), which results in moving the carriage 60 to the right (Fig. 2). During the first part of this movement of the carriage, the collar 38 will move with it to an extent sufficient to move the driving head 42 into the reverse gear 22, thus establishing in the transmission, the reverse gear connection. During the movement thus far described, the roller 54 will have moved only over the plane portion of cam 53, and there has been no acceleration of the engine. Upon continuing the movement of the carriage to the right (Fig. 2), it will appear that once the pins 68 start to enter the sloping portions of cam peaks 75, the blocks 66 are withdrawn from projections 72, and thereafter the carriage may be moved further to the right without any corresponding movement of collar 38 and hence of driving head 42. During this continued period of movement, the roller 54 engages the peak portion of cam 53 in a manner to cause a predetermined throttle opening for purposes of acceleration.

In analogous manner, when the lever 34 is moved to the right (Fig. 1), the carriage 60 will be advanced to the left of its neutral position, so that as the follower pins 68 are moved over the rectilinear portions of cams 69, a gear-ratio control movement is effected as soon as the collar 38 and driving head 42 serve to bring the driving head 42 into operative engagement within gear 21. Following such placement of the head 42, the blocks 66 are withdrawn and the carriage 60 permitted a free forward movement to the left (Fig. 2) during which time roller 51 will engage the first peak of cam 50 for purposes of accelerating the motor, while the transmission is in its first-speed position. In corresponding manner, as the driving head 42 is brought into the gear 20, the roller 51 again occupies a plane portion of cam 50, and after this speed change movement has been completed, the roller engages the second peak of cam 50. This sequence is continued upon movement of the carriage 60, to the left, with the result that upon a straight line movement of lever 34, the speed change elements are first brought into the selected driving ratio, and the motor is then sequentially accelerated conformably to the predetermined driving ratio.

It will have appeared from the foregoing description of the mechanism for sequentially actuating the clutch and head 42, that as the driving head is brought selectively into the several gears 19—22, the friction clutch elements are appropriately actuated through plungers 11 and 13 and clutch cams 45, so that the clutch is automatically actuated in predetermined sequence, just after establishing a selected gear ratio and yet prior to the ensuing period of acceleration. It will thus appear as an advantage of the present arrangement that, at the time of shifting, since the clutch is always then disengaged, there is no torque load from any one of the gears 19—22 to the driving head 42, and consequently no substantial resistance, at any time, to the movement of lever 34.

In the present example there has been illustrated an application of this invention to a special type of transmission and clutch assembly of a three-speed forward and reverse type. It will, however, appear that the same principles may be applied to transmissions providing for any desired reasonable number of different gear ratios; and further that the automatic throttle control features of this invention are of general application, not being necessarily restricted to a transmission and clutch assembly of the type selected for description and illustration.

It will also appear that the principles and structure described and illustrated are applicable to certain types of mechanical organizations in which, without regard to the provision of different gear ratios, it may be desirable to actuate a clutch, and a throttle of a prime mover connected therewith either in a given sequence, or concurrently. The present detailed description thus relates only to a single preferred example, and a number of changes may be made in the several parts, their combinations and structure, without departing from the spirit and intended scope of the invention as defined by the appended claims.

I claim:

1. In a power plant including a prime mover, a clutch and a speed change transmission, a control element, connections from said element for actuating the clutch and varying the speed ratio through said transmission, and additional connections from said element for varying the speed of said prime mover, sequentially with respect to clutch-actuating and speed-change control movements of said control element.

2. In an engine and transmission assembly, a control member, an elongate rocker cam connected to the throttle of the engine, a coacting follower movable responsively to said member to effect a predetermined sequence of throttle control movements, and a lost-motion clutching connection between said member and the transmission, adapted to effect gear-change control movements alternately with said throttle control movements.

3. In an engine, transmission and clutch assembly, a combined gear-ratio shifting and clutch actuating member, a control lever therefor, and means actuated by said lever for controlling the speed of said engine, conformably to and sequentially with the placement of said shifting and clutching member.

4. In an engine transmission and clutch assembly, a clutching and shifting lever, an engine throttle control adapted for actuation by the lever, and means responsive to movement of the lever in one direction to cause, first, a change in effective gear ratio through the transmission, followed by actuation of the clutch, and thereafter to actuate the throttle control.

5. In an engine and transmission assembly, a transmission control lever, a transmission control element, a throttle control element, and means for alternately connecting and disconnecting one of said elements from said control lever, as said lever is actuated in a given direction through a portion of its normal path of movement.

6. In an engine and transmission assembly, a transmission control lever, an engine throttle-control member adapted for actuation by said lever, a speed change member also adapted for actuation by said lever, and a clutching device operable by movement of the lever, for alternately making and breaking connection of the lever to one of said members, and adapted for preventing concurrent effective actuation of said members.

7. In an engine and transmission assembly, a transmission control lever, an engine throttle control member adapted for actuation by said lever, a gear-change member adapted for actuation by said lever, and a device adapted for selectively interlocking and disconnecting said gear change member and lever, said device comprising a cam and cam-follower assembly arranged to effect a sequence of alternate gear-change and throttle-control movements, responsively to movement of said lever in a given direction.

8. In an engine and transmission assembly, a transmission control lever, a cam element and a cam follower element adapted for actuation responsively to movement of said lever, one of said elements having connection with the engine throttle, said cam and follower elements arranged to produce a sequence of throttle control movements, as said lever is moved in one direction, one of said elements arranged for movement in a manner to disestablish connection between said lever and the engine throttle, when the lever is moved in an opposite direction.

9. A throttle control for an engine, including a rock shaft having connection with the engine throttle, a cam adapted to actuate said rock shaft, a manually controlled member movable with respect to said cam, and a cam follower adapted to coact with the cam when said member is moved in one direction with respect thereto, and adapted to clear the cam and remain inoperative with respect thereto, when said control member is moved in the opposite direction, with respect to said cam.

10. In a power plant including an engine, a friction clutch and a clutch-operating lever, a rocker member provided with a camming surface, operable by means of said lever, disposed along the path thereof and having connection with the engine throttle, a stationary camming element along the lever path, and means coacting therewith for effecting predetermined periods of engine acceleration by means of said throttle control rocker member, and alternating said periods with respect to the clutch-engaging positions of said lever.

11. In a power plant including an engine, a friction clutch and a transmission, an engine throttle, a lever in controlling relation with the engine throttle, the clutch and the transmission, and connections thereto, from said lever, adapted to permit a control of the throttle, independently of controlling actuation of the clutch.

12. In an engine and transmission assembly, a control lever having a control actuating portion movable axially of the transmission assembly, a rocker provided with cams, having connection to the throttle of the engine, a follower for said cams, carried by said portion of the control lever, a transmission control member, and a second cam assembly operable upon movement of said lever, selectively to establish and disestablish operative connection between said lever and the transmission control member.

13. In an engine and transmission assembly, a control lever therefor, a longitudinally movable control structure within the transmission adapted for actuation by said lever, a control-actuating cam disposed along the path of movement of said control structure, a follower for said cam carried by said structure, a transmission shaft adapted to be shifted responsively to predetermined movements of said structure, and a second cam and cam-follower assembly associated with said structure, and adapted sequentially to make and break an operative connection between said structure and said transmission shaft, as the structure is moved in a given direction, responsively to movement of said control lever.

14. In an engine and transmission assembly, a control lever, a connection from said lever to the throttle of the engine, a speed change control member within the transmission having detachable operative connection with said lever and clutching means for alternately making and breaking the operative connection between said speed change member and said lever, as the lever is moved in a given direction.

15. In a power plant including an engine and transmission, a control lever for the transmission, engine-speed control means operable from said control lever and a cam operated clutch arranged selectively to connect and disconnect the lever and transmission, and adapted, upon movement of said lever, alternately to connect the lever into and out of speed change controlling relation with the transmission.

16. In a power plant including an engine and transmission, a control lever having connection with the engine throttle and a clutching connection with a speed change control element of the transmission, a stationary cam associated with the transmission and a cam follower movable with the lever, adapted to actuate said clutching connection to permit movement of the lever, independently of effect on speed change control, through a portion of its path of movement, and to permit movement of the lever in another portion of its path concurrently with the speed change control.

17. In a power plant including an engine, a friction clutch and a transmission, a coordinated control for the engine, clutch and transmission including a control lever, a carriage member within and movable longitudinally of the transmission, a rockable cam positioned in the path of said carriage, a rock shaft arranged for actuation by said cam and having connection with an engine throttle, a cam follower on said carriage, a connection from said carriage to said control lever, a slidable shaft within the transmission, a clutch-actuating cam and a driving head carried by the slidable shaft, the driving head adapted selectively to be brought into operative engagement with certain of the transmission elements to effect changes in effective speed ratio through the transmission, a member secured to said shaft provided with lateral projections, said carriage being provided with a pair of movably mounted, recessed blocks, a pair of stationary cams carried within the transmission on opposite sides of said shaft, followers operable by said cams, upon movement of said carriage, and connected to said blocks, said cams being formed to effect a sequential engagement and disengagement between said blocks and the projections on said shaft-mounted member, as the carriage is moved in a given direction by means of said lever.

EUGENE S. BUSH.